Sept. 16, 1969        A. E. FLATT        3,466,669

INTRAMEDULLARY FINGER JOINT PROSTHESIS

Filed Sept. 20, 1966

INVENTOR
ADRIAN E. FLATT

BY Browne, Schuyler & Beveridge

ATTORNEYS

United States Patent Office 3,466,669
Patented Sept. 16, 1969

3,466,669
INTRAMEDULLARY FINGER JOINT PROSTHESIS
Adrian E. Flatt, Iowa City, Iowa, assignor to University of Iowa, Iowa City, Iowa, an educational institute of Iowa
Filed Sept. 20, 1966, Ser. No. 580,653
Int. Cl. A61f 1/04, 5/04
U.S. Cl. 3—1                    5 Claims

ABSTRACT OF THE DISCLOSURE

A hinged finger joint prosthesis has elongated members which are inserted into the bones. The longitudinal axes of the oppositely extending elongated members are located equidistally from their common transverse pivot axis.

---

This invention relates to an intramedullary finger joint prosthesis.

Rheumatoid disease of the hand often creates stiff and painful joints and sometimes hand function is lost. While recent developments lend hope that soft tissue deformities of the hand caused by rheumatoid arthritis will be corrected or alleviated, destruction of the joints of the digits still presents a serious medical problem. When a patient with gross joint destruction still retains adequate muscle control, finger joint prosthetic devices can often be used to replace the entire joint. In general, known finger joint prosthetic devices are comprised of two opposed elongated members joined by means of a screw or rivet about which the members can pivot. Devices of this type have been used for replacement of the proximal interphalangeal and metacarpophalangeal joints. To place the device in theh patient, one of the elongated members is inserted into the metacarpal or first phalanx bone while theh opposed elongated member is inserted into the first phalanx or second phalanx bone, depending upon whether the metacarpophalangeal or proximal interphalangeal joint is being replaced. The housing for the pivot about which the elongated members are mounted is located between the bones. Upon inserting the pivot in place, the device performs the function of the natural joint.

One of the first finger joint prosthetic devices was developed by Dr. Earl W. Brannon et al. and is reported in the Journal of Bone and Joint Surgery, vol. 41A, pages 87–102 (January 1959). The Brannon device consists of two elongated members joined by a hinged joint which is locked by a half threaded rivet about which the members rotate. The elongated members, adapted for insertion into the bones of the finger, are hexagonal in cross section and designed to prevent rotation of the finger after insertion. Strong, physiologically inert, materials such as stainless steel and titanium are used in fabricating the prosthetic device. Since Brannon's prosthetic device was reported, other workers in the field have come forward with improved designs. One of these, known as the Flatt prosthesis, was reported in the Journal of Bone and Joint Surgery, vol. 43A, pages 753–774 (July 1961). This prosthesis differs from the Brannon device in that each of the elongated members is bifurcated thereby providing two pairs of resilient elongated prongs which are more effective in preventing rotation of the finger in use than are the shaped members of the Brannon device. In both of these prior art prosthetic devices, the pivot about which the elongated members rotate has its center of rotation or axis perpendicular to and intersecting the axis of the elongated members when those members are opposed at an angle of 180°.

The metacarpophalangeal joint of the human hand, commonly referred to as one of the four knuckles, functions by means of tendons passing over the joint and producing an extending or flexing tendency. The tendency to extend or flex is dependent upon the location of the joint's center of rotation relative to the tendons acting. In the normal metacarpophalangeal joint, the center of rotation of the joint is approximately 40% to 60% of the intertendon distance from the extensor to the flexor profundus tendon measured from the extensor tendon. When the prior art prostheses are inserted into the metacarpal and first phalanx bones of the human hand and used to replace the metacarpophalangeal joint, the center of rotation of the pivot about which the elongated members rotate is located very near the extensor tendon, usually about 25% of the intertendon distance referred to above. Because of the discrepancy between the center of rotation of these prostheses as compared with normal joint center of rotation, a greater tendon force is required to straighten a normal finger joint. This increase in the required force has presented a serious obstacle to the utilization of finger prosthetic devices.

Accordingly, it is an object of this invention to provide an intramedullary finger joint prosthesis which alleviates the disadvantages inherent in the prior art devices.

A particular object of this invention is to provide a finger joint prosthetic device which substantially duplicates finger joint flexion and extension and which does not require an excessive amount of force to manipulate.

In accomplishing the objects of this invention, one feature resides in a modified finger joint prosthesis wherein the axis of the pivot about which the elongated members rotate is spaced from the axis of the elongated members when those members are opposed at an angle of 180°. When inserted into the hand and used to replace the metacarpophalangeal joint, this device substantially duplicates finger joint flexion and extension.

Other objects, features and advantages of this invention will be apparent to those skilled in the art from the following description of the invention taken in conjunction with the drawings wherein.

Figure 1:
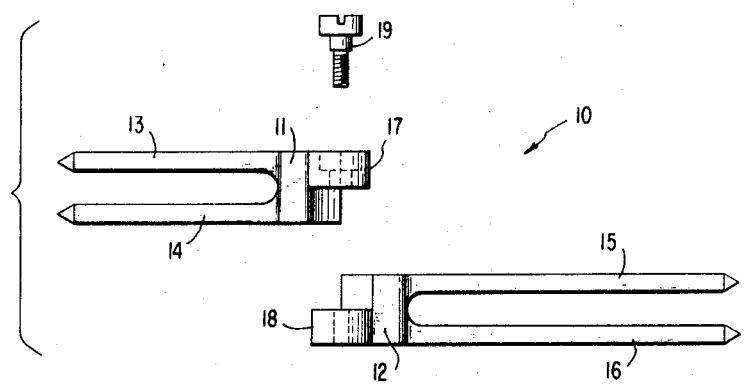
FIG. 1 is a planar view of the unassembled prosthesis of this invention.
Figure 2:
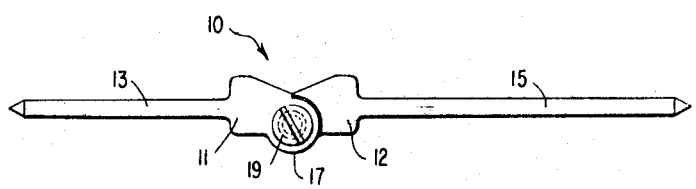
FIG. 2 is a side view of the prosthesis of this invention.

As shown in FIGS. 1 and 2, the improved prosthetic device 10 of this invention is comprised of sections 11 and 12 each of which terminates in a pair of prongs 13–14 and 15–16, respectively. The prongs 13–16 are adapted for insertion into the bones of the human hand and are sufficiently flexible to bend inwardly when inserted into a bone cavity. While sections 11 and 12 are shown as terminating in a pair of prongs, each can terminate in a single elongated member. The length of the prongs 13–16 is not a limitation on the invention and will vary depending upon the size of the bones of the person upon which the device is used. Sections 11 and 12 are provided with mating apertured members 17 and 18 by means of which they are rotatably mounted about a pivot 19. Pivot 19 can be a threaded bolt, rivet, or other equivalent means.

As best shown in FIG. 2, the apertures in members 17 and 18 are located below the level of prongs 13–16. When prosthetic device 10 is used to replace the metacarpophalangeal joint of the human hand, the center of rotation about pivot 19 closely approximates the center of rotation of the normal metacarpophalangeal joint. Preferably the axis of pivot 19 will be located at an equal distance of from 0.03 to 0.12 inch below the axis of both prongs 13–16 when prongs 13–14 and 15–16 are opposed at an angle of 180°. When oriented in this manner, the prongs are aligned when they extend in opposite directions.

Prosthetic device 10 is inserted into the hand in a manner identical to that employed in fitting the prior art devices. A dorsal transverse incision is used for the metacarpophalangeal joint. The joint to be replaced is most easily approached by exercising one collateral ligament and dislocating the joint laterally. The joint surfaces are removed piecemeal with rongeurs, as bone cutters may splinter and destroy more bone than is desirable. Generally, 1–3 millimeters more bone than is needed to accommodate the prosthesis is resected. When this is done, the joint will be slightly floppy at first, but good control over the finger will be obtained after the muscles have taken up the slack. Usually, it is relatively easy to insert the two-pronged stems of prosthetic device 10 within the medullary canals, since the prongs 13–16 spring sufficiently to adapt to the diameter of the canal. When the diameter of the canal is too small, a drill or a long shaft dental burr may be used to widen the canal.

Prongs 13–14 and 15–16 are inserted into the medullary canal of the metacarpal and first phalanx bone, respectively, and aligned in relation to the alignment of the finger.

When placing the proximal portion of the prosthesis, its first dorsal surface must be parallel with the flattened distal upper surface of the metacarpal. Similarly, the distal half of the prosthesis must be placed with its dorsal surface parallel with the plane of the fingernail. When both portions of the prosthesis have been properly aligned, they are driven in with an impactor. Pivot 19 is then inserted and one end is crimped.

Figure 3:
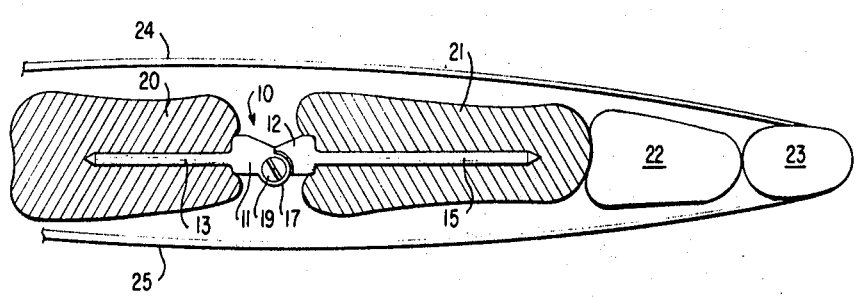
FIG. 3 is a side cross-sectional view of the prosthesis of this invention in place in the human hand.

FIG. 3 illustrates prosthetic device 10 in place in the metacarpophalangeal joint. As shown in FIG. 3, the human finger is composed of metacarpal 20, first phalanx 21, second phalanx 22, and third phalanx 23. Extensor tendon 24 is located above the finger while flexor tendon 25 is below the finger. Prongs 13–14 are maintained in place in the medullary canal of metacarpal bone 20 while prongs 15–16 are located in the medullary canal of first phalanx bone 21. Pivot 19 is located at the metacarpophalangeal joint.

The important feature of this invention is that pivot 19 be located at substantially the center of rotation of the normal metacarpophalangeal joint. Based on the distance from the extensor to the flexor tendon, the normal center of rotation of the joint is between 40% and 60% of the intertendon distance from the extensor tendon to the flexor profundus tendon measured from the extensor tendon. Prosthetic device 10 is designed so that the axis of pivot 19 will be located within this latter range, namely, from 40% to 60% of the intertendon distance. In this manner, prosthetic device 10 provides more nearly normal finger flexion and extension than was possible with devices of the prior art.

Improved results provided by the prosthetic device of this invention are illustrated by the following comparison. In the normal metacarpophalangeal joint in 30 degrees of flexion with a 1-pound flexor tendon force applied, an extensor force of 1.5 pounds is necessary to extend the joint. With the prior art Flatt prosthesis having a center of rotation intersecting the axis of the elongated members and located approximately 25% of the distance from the extensor to the flexor profundus tendon measured from the extensor tendon, a force of 8 pounds is required to extend the joint under the same conditions. Since patients using the device usually have weakened finger muscles, this increase of more than 500% in the required force is a substantial disadvantage in the prior art device.

With prosthetic device 10 of this invention having the center of rotation located approximately 60% of the intertendon distance from the extensor to the flexor profundus tendon measured from the extensor tendon, a force of only 0.75 pound was necessary to extend the joint under the same conditions. Since only 50% of the normal extensor force was needed, the device of this invention imparts substantially more function to the debilitated joint than was possible with the device of the prior art.

Thus, this invention provides a prosthetic device which can be used to restore movement to weakened finger joints. Since the device requires little force to operate, patients can achieve a greater degree of activity than was possible with the devices heretofore known.

What is claimed is:

1. A prosthetic device comprising first and second members of a size and shape adapted for operative insertion within bones of the human hand and means connecting said first and second members for rotation about a transverse axis spaced equidistally from the longitudinal axes of said first and second members, said members being constructed for movement to a position where their longitudinal axes are aligned and extend in opposite directions.

2. In a finger joint prosthesis having a first elongated member of a size and shape adapted for insertion into the metacarpal bone of the human hand, a second elongated member of a size and shape adapted for insertion into the first phalanx bone of the human hand and means for rotatably mounting said first and second elongated members about a transverse pivot member, the improvement wherein said first and second elongated members are rotatably mounted about a transverse pivot member having an axis spaced equidistally from the longitudinal axes of said first and second elongated members, said members being constructed for movement to a position where their longitudinal axes are aligned and extend in opposite directions.

3. The finger joint prosthesis as defined in claim 2 wherein the axis of said transverse pivot member is spaced a sufficient distance from the axis of said elongated members such that when said first elongated member is inserted into the metacarpal bone of the human hand and said second elongated member is inserted into the first phalanx bone of the human hand, the axis of said pivot will be located approximately 40% to 60% of the intertendon distance from the extensor tendon to the flexor profundus tendon of the human hand measured from the extensor tendon.

4. The finger joint prosthesis as defined in claim 2 wherein the axis of said pivot is spaced from 0.03 to 0.12 inch from the axis of said first and second elongated members when said members are opposed at an angle of 180°.

5. The finger joint prosthesis as defined in claim 2 wherein said first and second elongated members are bifurcated.

References Cited

UNITED STATES PATENTS 2,696,817  12/1954  Prevo.

FOREIGN PATENTS 939,226  2/1956  Germany.

OTHER REFERENCES

"Use of a Hinged Vitallium Prosthesis for Arthroplasty of the Knee" by H. Herman Young, Journal of Bone and Joint Surgery, vol. 45A, No. 8, December 1963, pp. 1627–1642.

Journal of Bone and Joint Surgery, vol. 46A, No. 7, October 1964, Advertising, p. 29.

Vitallium Surgical Appliances, Austenal Surgical Products, Catalog by Howmet Corp., published in 1964, p. 53.

RICHARD A. GAUDET, Primary Examiner

RONALD L. FRINKS, Assistant Examiner

U.S. Cl. X.R.

128—92